US009112916B2

United States Patent
Summerson et al.

(10) Patent No.: US 9,112,916 B2
(45) Date of Patent: *Aug. 18, 2015

(54) SYSTEMS AND METHODS FOR CONSTRUCTION OF AND NETWORK CODING USING NEAR-MAXIMUM DISTANCE SEPARABLE (MDS) LINEAR NETWORK CODES

(75) Inventors: Samantha Rose Summerson, Houston, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/595,862

(22) Filed: Aug. 27, 2012

(65) Prior Publication Data

US 2013/0230058 A1    Sep. 5, 2013

Related U.S. Application Data

(60) Provisional application No. 61/527,947, filed on Aug. 26, 2011.

(51) Int. Cl.
*H04J 3/24* (2006.01)
*H04L 29/06* (2006.01)
*H04L 1/00* (2006.01)

(52) U.S. Cl.
CPC .............. *H04L 69/22* (2013.01); *H04L 1/0045* (2013.01); *H04L 1/0057* (2013.01)

(58) Field of Classification Search
CPC .................................................. H04L 1/0076
USPC ......... 370/474; 714/776; 375/240.01; 341/50
See application file for complete search history.

(56) References Cited

U.S. PATENT DOCUMENTS

| | | | |
|---|---|---|---|
| 5,278,846 A | 1/1994 | Okayama et al. | |
| 8,185,811 B2 | 5/2012 | Li et al. | |
| 2002/0006138 A1 | 1/2002 | Odenwalder | |
| 2002/0172292 A1 | 11/2002 | Gray | |
| 2003/0093741 A1 | 5/2003 | Argon et al. | |
| 2004/0025102 A1 | 2/2004 | Yokokawa | |
| 2006/0170571 A1* | 8/2006 | Martinian et al. | 341/50 |
| 2009/0080510 A1* | 3/2009 | Wiegand et al. | 375/240.01 |
| 2009/0300469 A1 | 12/2009 | Rajakarunanayake | |
| 2010/0153822 A1* | 6/2010 | Huang et al. | 714/776 |
| 2010/0201398 A1 | 8/2010 | Zhao et al. | |
| 2010/0205510 A1 | 8/2010 | von der Embse | |
| 2012/0151295 A1 | 6/2012 | Neeman et al. | |
| 2012/0236763 A1 | 9/2012 | Lucani et al. | |
| 2013/0297994 A1 | 11/2013 | Eroz et al. | |

* cited by examiner

*Primary Examiner* — Wei Zhao
*Assistant Examiner* — Lionel Preval
(74) *Attorney, Agent, or Firm* — Steven A. Shaw; Frank D. Cimino

(57) ABSTRACT

A method for network coding using a near-maximum distance separable linear network code includes generating a message matrix where each column of the message matrix corresponds to one of K message packets and each element in a column of the message matrix corresponds to one of the symbols of the corresponding message packet. The method also includes generating a network code matrix to map the K message packets to N encoded packets, where any combination of K+1 columns of the network code contains at least K columns that are linearly independent. Further, the method includes multiplying the message matrix by the network code matrix to generate a transmission matrix, where each column of the transmission matrix corresponds to an encoded packet for wireless transmission.

14 Claims, 4 Drawing Sheets $$X = \begin{bmatrix} p_{1,1} & p_{1,2} & \cdots & p_{2,K} \\ p_{2,1} & p_{2,2} & \cdots & p_{2,K} \\ \vdots & \vdots & \cdots & \vdots \\ p_{L,1} & p_{L,2} & \cdots & p_{L,K} \end{bmatrix} \quad A = \begin{bmatrix} a_{1,1} & a_{1,2} & \cdots & a_{1,N} \\ a_{2,1} & a_{2,2} & \cdots & a_{2,N} \\ \vdots & \vdots & \cdots & \vdots \\ a_{K,1} & a_{K,2} & \cdots & a_{K,N} \end{bmatrix} \quad Y = \begin{bmatrix} y_{1,1} & y_{1,2} & \cdots & y_{1,N} \\ y_{2,1} & y_{2,2} & \cdots & y_{2,N} \\ \vdots & \vdots & \cdots & \vdots \\ y_{L,1} & y_{L,2} & \cdots & y_{L,N} \end{bmatrix}$$

FIG. 3a $$R = \begin{bmatrix} r_{1,1} & r_{1,2} & \cdots & r_{1,M} \\ r_{2,1} & r_{2,2} & \cdots & r_{2,M} \\ \vdots & \vdots & \cdots & \vdots \\ r_{L,1} & r_{L,2} & \cdots & r_{L,M} \end{bmatrix} \quad A' = \begin{bmatrix} a'_{1,1} & a'_{1,2} & \cdots & a'_{1,K} \\ a'_{2,1} & a'_{2,2} & \cdots & a'_{2,K} \\ \vdots & \vdots & \cdots & \vdots \\ a'_{K,1} & a'_{K,2} & \cdots & a'_{K,K} \end{bmatrix} \quad X' = \begin{bmatrix} p_{1,1} & p_{1,2} & \cdots & p_{1,K} \\ p_{2,1} & p_{2,2} & \cdots & p_{2,K} \\ \vdots & \vdots & \cdots & \vdots \\ p_{L,1} & p_{L,2} & \cdots & p_{L,K} \end{bmatrix}$$

FIG. 3b

SYSTEMS AND METHODS FOR CONSTRUCTION OF AND NETWORK CODING USING NEAR-MAXIMUM DISTANCE SEPARABLE (MDS) LINEAR NETWORK CODES

CROSS-REFERENCE TO RELATED APPLICATION

The present application claims priority to U.S. Provisional Patent Application No. 61/527,947 filed on Aug. 26, 2011; Ser. Nos. 13/595,774, 13/595,894, 13/596,000, and 13/596,005, now U.S. Pat. No. 8,839,085. All related application were filed on Aug. 27, 2012.

BACKGROUND

In wireless networks, the ability to correctly receive data packets with increased reliability is important. Typically, if a packet is lost in transmission, the intended recipient requests that the sender retransmit the packet. However, certain systems that utilize a wireless network may require a very low packet loss and retransmission rate, for example where the data being transmitted via the wireless network is critical to the safety or performance of the system. In these systems, packet loss leading to requests for retransmission is unacceptable.

Network coding is a technique that can be used to improve the capacity and efficiency of network transmissions. Network coding functions by transmitting an encoded function of the data bits rather than the original data bits; subsequently, the function of the data bits is decoded to obtain the original data bits. Transmitting functions of the data bits in this manner can reduce the average number of transmissions needed for a given amount of information, which reduces the number of retransmissions needed if there are bit errors or erasures.

Applying a network code to the bits of a packet results in a greater number of bits than originally contained in the packet. Although the extra bits that result from the application of the network code enable the recipient to successfully decode and recover the original bits if the packet is received, if a packet is lost during transmission, the packet must be retransmitted.

SUMMARY

The problems noted above are solved in large part by embodiments directed to a method for network coding using a near-maximum distance separable linear network code includes generating a message matrix where each column of the message matrix corresponds to one of K message packets and each element in a column of the message matrix corresponds to one of the symbols of the corresponding message packet. The method also includes generating a network code matrix to map the K message packets to N encoded packets, where any combination of K+1 columns of the network code contains at least K columns that are linearly independent. Further, the method includes multiplying the message matrix by the network code matrix to generate a transmission matrix, where each column of the transmission matrix corresponds to an encoded packet for wireless transmission.

Other embodiments are directed to a non-transitory computer-readable medium containing instructions that, when executed by a processor, cause the processor to generate a message matrix where each column of the message matrix corresponds to one of K message packets and each element in a column of the message matrix corresponds to one of the symbols of the corresponding message packet. The instructions, when executed, also cause the processor to generate a network code matrix to map the K message packets to N encoded packets, where any combination of K+1 columns of the network code contains at least K columns that are linearly independent. Further, the instructions, when executed, cause the processor to multiply the message matrix by the network code matrix to generate a transmission matrix, where each column of the transmission matrix corresponds to an encoded packet for wireless transmission.

Still other embodiments are directed to a wireless communication device, including a network encoder and a physical layer. The network encoder is to generate a message matrix where each column of the message matrix corresponds to one of K message packets and each element in a column of the message matrix corresponds to one of the symbols of the corresponding message packet. The network encoder is also to generate a network code matrix to map the K message packets to N encoded packets, where any combination of K+1 columns of the network code contains at least K columns that are linearly independent. Further, the network encoder is to multiply the message matrix by the network code matrix to generate a transmission matrix, where each column of the transmission matrix corresponds to an encoded packet for wireless transmission. The physical layer is to transmit the encoded packets via a wireless antenna.

Yet other embodiments are directed to a method for generating a near-maximum distance separable linear network code having a coding rate of K/N including defining a set V that contains all vectors of length K having entries over a finite field and an initially-empty network code set A. If a cardinality of the network code set A is less than K, the method includes continually removing a vector $x_i$ from V and inserting $x_i$ into the network code set A if $x_i$ and A are linearly independent and incrementing i. If the cardinality of the network code set A is greater than or equal to K and the set V is not empty and the cardinality of A is less than N, the method includes continually removing $x_i$ from V and inserting $x_i$ into the network code set A and incrementing i if all subsets B of the network code set A having a cardinality K contain a subset C of cardinality K−1 that, when combined with $x_i$ forms a linearly independent set, and continually removing $x_i$ from V and incrementing i if not all subsets B of the network code set A having a cardinality K contain a subset C of cardinality K−1 that, when combined with $x_i$ forms a linearly independent set.

BRIEF DESCRIPTION OF THE DRAWINGS

For a detailed description of exemplary embodiments of the invention, reference will now be made to the accompanying drawings in which:

FIGS. 3a and 3b show examples matrices used for network coding in accordance with various embodiments;

NOTATION AND NOMENCLATURE

Figure 1:
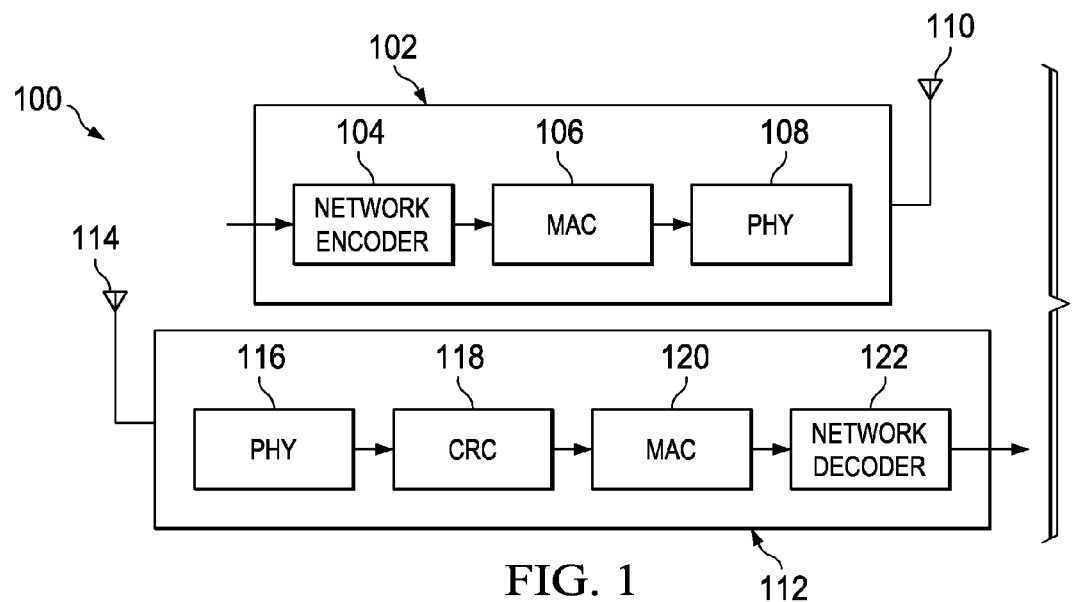
FIG. 1 shows a wireless communications system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "symbol" refers to a grouping of bits, which exists in a Galois field (GF) of $GF(2^q)$, where q bits are grouped into a symbol.

As used herein, the term "message packet" refers to packets that contain data to be transmitted one node to another node in a wireless network.

As used herein, the term "encoded packet" refers to packets that result from encoding a group of message packets according to the various embodiments of the present disclosure.

As used herein, the term "coding rate" refers to the ratio of message packets to encoded packets. For example, if five encoded packets are produced by encoding three message packets, the coding rate is 3/5. Similarly, if seven encoded packets are produced by encoding five message packets, the coding rate is 5/7.

As used herein, the term "erasure packet" or "erasure signal" refers to an indication sent to a decoder at a recipient when a packet failure occurs during transmission of one of the encoded packets (e.g., bit errors or cyclic redundancy check (CRC) failures are detected that occurred during transmission of the encoded packet).

As used herein, the term "received packet" refers to packets successfully received by a decoder at a recipient. For example, if five encoded packets are transmitted and one packet failure occurs, the decoder receives four received packets and one erasure packet or signal.

As used herein, the term "recovered packet" or "decoded packet" refers to packets that result from decoding a group of received packets according to the various embodiments of the present disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As explained above, a packet containing data in the form of bits or symbols is typically encoded by applying network codes to the bits or symbols of the packet to provide redundancy and data recovery ability in the event that certain bits or symbols of the packet are lost during transmission. This may reduce the average number of transmissions needed for a given amount of information, which subsequently reduces the number of retransmissions in the event of an error or packet erasure. However, if an entire packet is lost during transmission, the packet must be retransmitted.

To take advantage of time diversity in the system and increase reliability, a network code is applied across a plurality of message packets to produce a larger number of encoded packets. The network encoder may assume that the message packets are of the same size. The output of the network encoder is encoded packets that are of the same size as the message packets. The resulting encoded packets may then be transmitted using an existing underlying wireless communication protocol without modification.

In accordance with various embodiments, the network code is applied to multiple message packets (e.g., K message packets) to produce a number of encoded packets (e.g., N encoded packets) greater than the number of message packets. The network code is applied in such a way that the length of the encoded packets is the same as the length of the message packets. The network code is designed such that the recipient can decode the K original message packets from the received encoded packets (or "received packets") as long as the number of received packets is greater than or equal to some parameter, typically K. If K or more packets have been received correctly, then the original K message packets can be decoded correctly; the network code is referred to as maximum distance separable (MDS). However, as will be explained in further detail below, requiring a MDS network code for small Galois fields (GF) or finite fields restricts the possible values of N relative to K. In particular, in the MDS case for GF(2) (i.e., a binary field), N cannot be greater than K+1. However, if the packet error rate (PER) of a wireless channel is greater than 1/(K+1), it may be desirable to have N be greater than K+1. By preemptively sending a larger number of packets than what is required, network coding reduces the PER and correspondingly the retransmission rate and improves the reliability of a wireless network.

In situations where high packet transmission reliability is required, the application of such a network code provides numerous advantages. For example, a PER of the system or wireless channel may be experimentally determined and the network code may be chosen such that the PER is less than the fraction of packets that can be lost in transmission while still maintaining the ability to recover or decode the original message packets. Additionally, by making the network code known to both the transmitter and the receiver rather than random, the network code does not have to be transmitted along with various packets, which reduces the overhead and increases the throughput of the system. Further, the inverse of the network code (i.e., to decode the received packets) does not need to be calculated on-the-fly because the network code is known to the receiver, which reduces software and hardware complexity and computational requirements.

As explained above, the way in which the network code is applied to message packets results in encoded packets that have the same length as the message packets. Network coding in accordance with the various examples of the present disclosure may be leveraged on top of existing wireless communications protocols without the need to redesign other aspects of the system. In certain embodiments, the network code is applied at the network layer, which allows the network code to be applied on top of an existing wireless communication protocol, such as Wi-Fi or Bluetooth, to increase the reliability of the system.

In accordance with various embodiments, a network code matrix is generated that maps K message packets to N encoded packets, where the encoded packets are of the same length as the message packets. To enable N to be greater than K+1, particularly where the network code is over GF(2) (e.g., to retain low computational complexity in applying the network code matrix for encoding and decoding operations), the application network code matrix allows for the original K message packets to be recovered correctly if K+1 or more encoded packets are received correctly. This is referred to herein as being "near-MDS," since receiving K encoded packets correctly does not guarantee that the original K message packets will be recoverable, however receiving K+1 or more encoded packets correctly does guarantee that the original K message packets will be recoverable. In some cases, it is possible to recover the original K message packets even if only K encoded packets are received. In particular, if the subset of K encoded packets corresponds to linearly independent columns of a network code matrix, which will be explained in further detail below.

The network code matrix should, when applied to message packets, produce encoded packets such that for any K+1 (or more) sets of encoded packets, there is a subset of K linear combinations of encoded packets that are linearly independent. As will be explained in further detail below, this is achieved by ensuring that for any K+1 columns of the network code matrix, there exists a subset of K linear combinations of columns that are also linearly independent.

Turning now to FIG. 1, a wireless communications system 100 is shown in accordance with various embodiments. The system 100 includes a transmitter 102 and a receiver 112. Although the transmitter 102 and receiver 112 are shown separately, this is for simplicity of explanation and one skilled in the art appreciates that the functionality of both the transmitter 102 and the receiver 112 may be embodied in a single wireless transceiver that communicates with other wireless transceivers. The transmitter 102 includes at least a network encoder 106, a medium access control (MAC) layer 106 and a physical layer (PHY) 108. The MAC 106 and the PHY 108 coordinate to enable wireless communications (e.g., transmitting and receiving data packets) via a wireless antenna 110. Similarly, the receiver 112 includes at least a PHY 116, a cyclic redundancy check (CRC) error-detecting block 118, a MAC 120 and a network decoder 122. As above, the MAC 120, the CRC 118 and the PHY 116 coordinate to enable wireless communications via a wireless antenna 114. In some embodiments, the CRC 118 may be replaced or supplemented by a different type of packet error-detecting block.

In accordance with various embodiments, the network encoder 104 receives K message packets containing data to be transmitted from, for example, a higher-layer application executing on the transmitter 102. The network encoder 104 also encodes the message packets to produce N encoded packets, where N is greater than K+1. As explained above, the length of the message packets is preserved when encoded to produce the encoded packets, and thus the encoded packets are suitable for transmission by the PHY 108 using an underlying wireless communication protocol of the transmitter 102.

In accordance with various embodiments, the network encoder 104 encodes the message packets by first generating a message matrix having each of the K message packets as a column. That is, each element in a column of the message matrix corresponds to one of the symbols of the message packet that forms that column. The network encoder 104 also generates a network code matrix to map the K message packets to N encoded packets. In some embodiments, the network code matrix may be generated at the time of system design; that is, the network code matrix is not generated each time a group of message packets are transmitted. Finally, the network encoder 104 multiplies the message matrix by the network code matrix, which generates a transmission matrix. The transmission matrix contains N columns, corresponding to N encoded packets. Subsequently, the encoded packets may be sent to the PHY 108 (e.g., via the MAC 106) for wireless transmission.

As explained above, it is not possible to construct an MDS network code that has dimension K×N, where any and all subsets of K columns are invertible (in other words, form a basis) over GF(2) when N is greater than K+1. Increasing the size of the Galois field may allow for N to be greater than K+1 while maintaining an MDS network code. However, the complexity of the encoding and decoding operations increases with network codes over higher order fields. Thus, it may be advantageous for particular systems to construct a linear network code where N is greater than K+1 (e.g., to accommodate for a higher PER) while also minimizing complexity of encoding and decoding operations by minimizing the size of the Galois field employed in the encoding and decoding operations.

As an example, the following assumes constructing near-MDS network code over GF(2). However, one skilled in the art appreciates that similar techniques may be employed for Galois field values larger than 2 (e.g., GF($2^m$) for m greater than 1). The coding rate of the network code is K/N, and thus the network code matrix has a dimension of K×N. Additionally, the network code matrix is designed such that for any K+1 rows, there exists a K×K sub-matrix that is invertible (i.e., non-singular). As explained above, a network code of this type is referred to as near-MDS. In other words, at most K+1 encoded packets need to be received successfully in order to recover K original message packets. This type of network code requires that at most one additional packet needs to be received correctly when compared to a MDS code. However, the complexity of a near-MDS network code may be lower because operations are over a smaller field, such as GF(2) where N is greater than K+1.

In accordance with various embodiments, a near-MDS network code matrix should have the Hamming weight of each row be at least N−K. If this is not the case, it may be possible to receive K+1 linear combinations of packets at the receiver 112 that are generated from less than the K message packets. For higher-order Galois fields, there should be at least N−K non-zero entries per row. Although construction of network code matrices that satisfy the near-MDS property will be discussed with respect to GF(2), increasing the field size increases the possibilities of finding an near-MDS code for arbitrary N.

Figure 2:
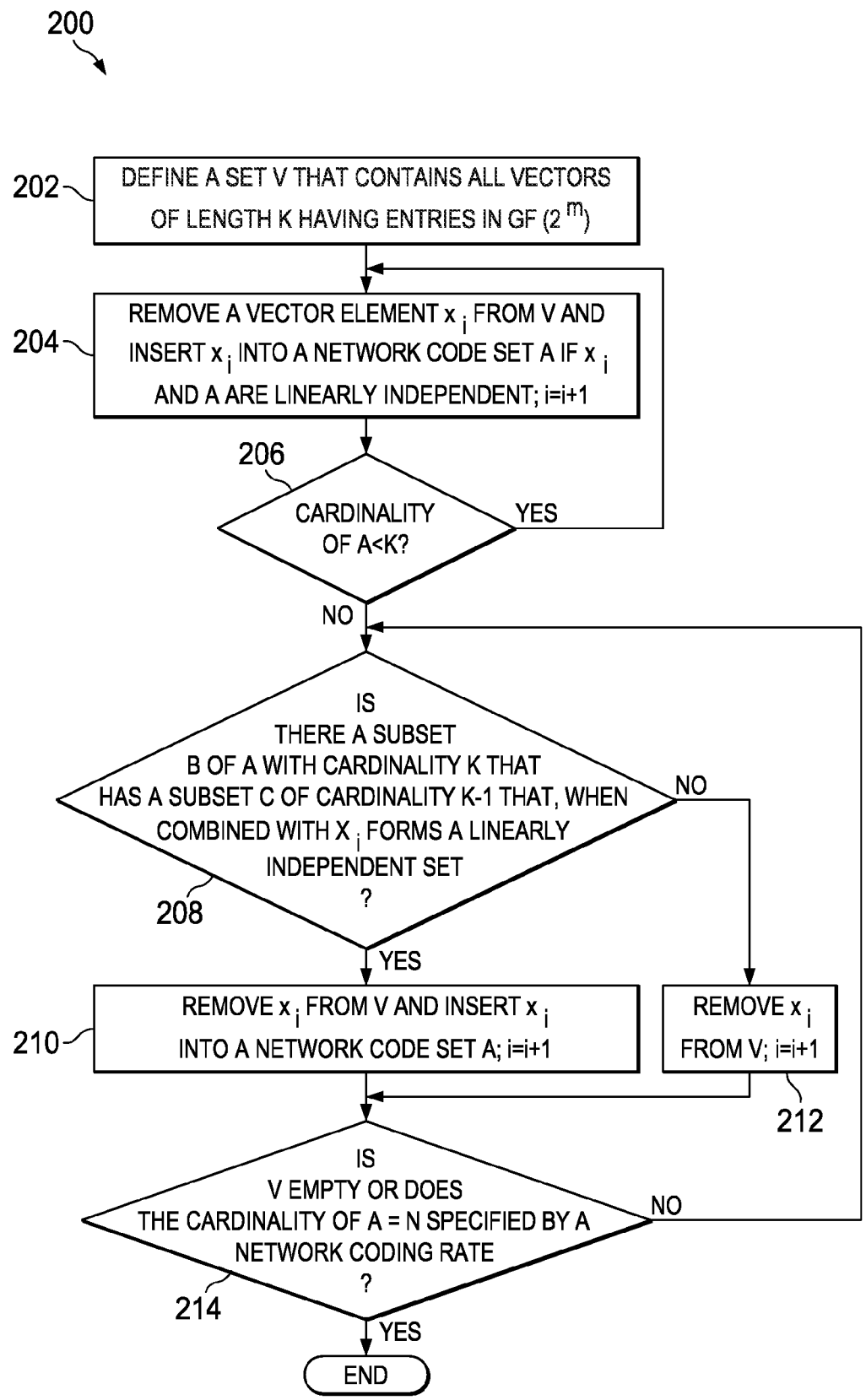
FIG. 2 shows a flow chart of a method in accordance with various embodiments.

FIG. 2 shows a method 200 in accordance with various embodiments. The method 200 describes an algorithm for finding a set of network coding vectors that comprise a near-MDS code, such that for any K+1 columns, there exists a subset of K vectors that are linearly independent or invertible. The method 200 may be performed by a hardware processor of the transmitter 102, the receiver 112, or other device. The set of network coding vectors is formed into the network code matrix that, when applied to a message matrix of K message packets maps the message matrix to a transmission matrix having N transmission packets.

First, in block 202, a set V is defined that contains all vectors of length K having entries in GF($2^m$). For this example, assume that K=3, N=5, and the network code matrix is generated over GF(2) (i.e., m=1). Thus, the set V={(0,0,0), (0,0,1), (0,1,0), (1,0,0), (0,1,1), (1,0,1), (1,1,0), (1,1,1)}. Next, in block 204, a vector $x_i$ is removed from the set V and placed into a network code set A if $x_i$ and A form a linearly independent set. When a vector $x_i$ is removed, i is updated to i+1. This step is repeated for additional $x_i$ while the cardinality of A is less than K, as noted in block 206. For this example, let $x_i$ begin as (0,0,1). Thus, testing the vectors of V in the order they appear above, this step is repeated twice more to give A={(0,0,1), (0,1,0), (1,0,0)}. At this point, the cardinality of A is equal to K, so the method proceeds to block 208.

Continuing, all subsets B of A having cardinality K are checked to determine whether each has a subset C of cardinality K−1 that, when combined with $x_i$, forms a linearly independent set. If so, $x_i$ is removed from V as in block 210, A is updated to include $x_i$, and i is updated to i+1. This continues until A includes N vectors that satisfy the above constraints or the set V is empty, as shown in block 214. For example, there is only one subset of A that has cardinality K, so B=A. There are three subsets of B that have cardinality K−1. However, it only needs to be demonstrated that one subset C, when combined with the next test vector (i.e., (0,1,1)) forms a linearly independent set. For example, consider C={(0,1,0), (1,0,0)}, which in union with the test vector is linearly independent. Thus, A is updated to be A={(0,0,1), (0,1,0), (1,0,0), (0,1,1)}. Additionally, if there is no subset C that, when combined with $x_i$, forms a linearly independent set, $x_i$ is removed from V and i is updated to i+1 as in block 212.

The set A now has four subsets of cardinality K, referred to below as $B_i$ for i=1, 2, 3, 4:

$B_1$={(0,0,1), (0,1,0), (1,0,0)}
$B_2$={(0,0,1), (0,1,0), (0,1,1)}
$B_3$={(0,0,1), (1,0,0), (0,1,1)}
$B_4$={(0,1,0), (1,0,0), (0,1,1)}

For each $B_i$, it is verified whether there exists a subset of cardinality K−1 such that the next test vector (1,0,1) and the subset form a linearly independent set. For each $B_i$ there are three subsets of cardinality K−1 but, as above, it is sufficient to demonstrate that at least one of the subsets satisfies this condition. Using similar notation to above, these subsets of $B_i$ are referred to as $C_i$. The following sets in union with the next test vector (i.e., (1,0,1)) form a linearly independent set:

$C_1$={(0,0,1), (0,1,0)}
$C_2$={(0,0,1), (0,1,1)}
$C_3$={(1,0,0), (0,1,1)}
$C_4$={(0,1,0), (1,0,0)}

Thus, A is updated to be A={(0,0,1), (0,1,0), (1,0,0), (0,1,1), (1,0,1)} and the method 200 ends because the cardinality of A is equal to N. A network code matrix is formed by using each vector in A as a column in the matrix. It is noted that the sets C above are not unique, but this is acceptable since only existence of a subset $C_i$ that satisfies the conditions needs to be shown. Additionally, the output of the method 200 is generally not unique and is dependent on the starting vector and the order of vector selection within V. For example, the vectors in V may be ordered according to decreasing Hamming weight such that high-weight vectors are selected before lower-weight vectors.

In accordance with various embodiments, the network code matrix that is generated by the method 200 possesses the property that for any K+1 columns, there exists a subset of K vectors that are linearly independent or invertible. Additionally, the method 200 may be generalized to construct linear network codes of rate K/N such that for any K+j encoded packets there exists a subset of K linearly independent packets, where j is greater than or equal to 1. Such a construction ensures that for any K+j received packets, all K original message packets are recoverable. In particular, block 206 may be repeated while the cardinality of A is less than K+j−1 and the subsets B referred to in block 208 are of cardinality K+j−1.

FIG. 3a shows a message matrix X, a network code matrix A, and a transmission matrix Y to illustrate the functionality of the network encoder 104 in further detail. The message matrix X contains K message packets, where each column in X represents a message packet; that is, the elements of a column correspond to symbols or bits of a message packet. As shown, the message matrix X contains L rows, which is the length of the message packets.

The transmission matrix Y is created by multiplying the message matrix X by the network code matrix A. The network code matrix A maps the message matrix X, which is L×K, to the transmission matrix Y, which is L×N. Each of the N columns of the transmission matrix Y corresponds to a transmission packet, also of length L. The network code matrix A may be formed as explained above, such that for any K+1 columns of the network code matrix A, there exists a subset of K columns (or vectors) that are linearly independent and invertible. Additionally, the number of possible values of N is dependent on the size of the finite field. For a small size finite field, fewer acceptable values of N for a given K may be available. For a large size finite field, the number of acceptable values of N for a given K may be larger. Thus, depending on system requirements (e.g., PER), a larger finite field may be selected to enable the use of a network code matrix A where N can be more specifically tailored with respect to K.

In some cases, it may be desirable to use a known network code matrix A. For example, a known network code matrix A does not need to be transmitted in every packet and the transmitter 102 and receiver 112 can be optimized for the network code matrix A. The inverse of the network code matrix A may be pre-computed (i.e., for decoding a group of received packets) and its implementation can be optimized at the receiver. In accordance with various embodiments, the network code applied by the network code matrix A is near-MDS, which means that if K+1 or more packets have been received correctly, then the original K message packets can be decoded correctly. Additionally, if only K packets are received, it may still be possible to correctly decode the original K message packets provided that the corresponding columns (i.e., the columns having the same indices as those of the K packets received) of the network code matrix A are linearly independent.

Referring again to FIG. 1, the PHY 116 of the receiver 112 receives the N transmission packets and passes the transmission packets to the CRC 118 for error checking. Typically, all N transmission packets are received; however, in some cases, certain packets may never be received. As will be explained in further detail below, a sequence number or index may be applied to each received packet (e.g., by being transmitted with the packet) that identifies the column of the transmission matrix Y that the received packet corresponds to.

Some transmission packets may not pass the CRC 118, meaning that those packets contain one or more errors and are considered erasures. In some embodiments, the CRC 118 may generate an erasure packet or erasure signal to be sent to the network decoder 122 (e.g., via the MAC 120) to inform the network decoder 122 of the transmission packets that were not received successfully. The transmission packets that do pass the CRC 118 (i.e., contain no errors) are referred to as received packets and are sent to the network decoder 122. As explained above, the network code applied to generate the transmission packets is near-MDS. As a result, provided that at least K+1 transmission packets pass the CRC 118 as received packets, the network decoder 122 is able to decode or recover the original K message packets. Further, as mentioned above, in some cases the original K message packets may be decoded if only K transmission packets are received; however, at least K+1 transmission packets must be received to guarantee that the original K message packets are recoverable.

FIG. 3b shows a matrix R that includes M received packets, a decoding matrix A' and a recovered matrix X' to illustrate the functionality of the network decoder 122 in further detail.

Although the matrix R is shown as having M columns each corresponding to a received packet, in accordance with various embodiments a received packet matrix (not shown) is generated that contains a number of received packets equal to the number of message packets required by the near-MDS network code, namely K+1. As explained above, a near-MDS network code may be similarly constructed for K+j where j is an integer greater than 1, in which case the received packet matrix contains K+j received packets.

The selection of received packets may take many forms, provided that K+1 received packets are selected to make up the columns of the received packet matrix. As explained above, the network decoder 122 is able to decode or recover the original K message packets provided that at least K+1 transmission packets pass the CRC 118 as received packets. Additionally, as will be explained in further detail below, the decoding matrix A' is a K×K matrix, and thus the received packet matrix also contains K columns so that it may be multiplied by the decoding matrix A'.

The decoding matrix A' is formed by first selecting columns from the network coding matrix A that have indices that are the same as the indices of the encoded packets that correspond to the selected received packets. In some embodiments, a sequence number or index may be applied to each received packet (e.g., by being transmitted with the packet) that identifies the column of the transmission matrix Y that the received packet corresponds to. In other words, K+1 (in the above example) columns of the network coding matrix A are selected. For example, assume the network code applies a coding rate of 5/8, and the network code is a near-MDS code designed to require at most K+1 received packets to decode the original K message packets. Thus there are 8 encoded packets in the transmission matrix Y. Of the 8 encoded packets, the encoded packet in column 5 of the transmission matrix Y does not pass the CRC 118. Thus there are 7 received packets that correspond to encoded packets in the transmission matrix having indices 1, 2, 3, 4, 6, 7 and 8. Then, assume that the received packet selection scheme is to select the first K+1 (i.e., 6 in this case) received packets to generate the received packet matrix. Thus, the selected received packets correspond to encoded packets in the transmission matrix having indices 1, 2, 3, 4, 6 and 7 and make up the columns of the received packet matrix.

As a result, columns 1, 2, 3, 4, 6 and 7 of the network coding matrix A are selected, since these columns have the same indices as the encoded packets that correspond to the selected received packets in the received packet matrix. As explained above, it is not necessary that these 6 columns (i.e., K+1 columns) be linearly independent; however, at least one subset of 5 columns (i.e., K columns) is linearly independent as a result of the design of the network coding matrix A explained above. Thus, a subset of 5 of columns 1, 2, 3, 4, 6 and 7 of the network coding matrix A that is linearly independent is further selected, which results in a K×K matrix. The resulting matrix is inverted to form the decoding matrix A'.

Further, the arrangement of the selected columns of the network coding matrix A in the decoding matrix A' should match the arrangement of the selected received packets in the received packet matrix. For example, if the ordering of the selected received packets is for some reason altered, then the ordering of the selected columns of the network coding matrix A should be similarly altered. One skilled in the art will appreciate that inversion of the sub-matrix of the network coding matrix A is possible because a property of any K+1 columns of the network coding matrix A is a subset of K columns exists that is linearly independent.

To facilitate the multiplication of the received packet matrix, which currently contains K+1 columns or received packets, by the decoding matrix A', which contains K rows, the K columns of the received packet matrix that correspond to the subset of the network coding matrix A that was determined to be linearly independent are selected and the extra column is discarded. Thus, the resulting received packet matrix is L×K and the decoding matrix A' is K×K.

Subsequently, the received packet matrix is multiplied by the decoding matrix A' to generate a recovered matrix X'. Each column of the recovered matrix X' corresponds to one of the original K message packets, and thus the original K message packets are decoded successfully at the receiver 112 despite an encoded packet being lost during transmission from the transmitter 102 to the receiver 112. Additionally, although the above example only suggested one packet was lost during transmission, where the network code is designed such that N is greater than K+1, up to N−K+1 packets may be lost during transmission and the original K message packets are still guaranteed to be recoverable by the network decoder 112.

Alternately, in some embodiments all M received packets may be selected, provided that M is greater than K. In this case, A' may be generated by taking the pseudo-inverse of the corresponding M columns of the network code matrix A. Thus, the received packet matrix comprises the matrix R, which is L×M; the decoding matrix A' is M×K; and the decoded matrix X' is L×K. As above, each column of the decoded matrix X' corresponds to one of the original K message packets.

In accordance with various embodiments, by preemptively sending a larger number of packets (i.e., N packets) than what is required for successful decoding (i.e., K+1 packets), the PER is reduced and thus retransmission of packets is correspondingly reduced. This provides increased reliability for wireless communications in the system 100. Additionally, as explained above, the network coding scheme may be employed at the network layer so that underlying wireless communications protocols may be maintained without costly modification. However, in alternate embodiments, the network coding scheme may be employed at the MAC 106, 120 with minimal modifications while still taking advantage of already-developed commercial devices that utilize certain wireless communication protocols.

The above-described wireless communication system 100 may be employed to provide a point-to-point link, however is not limited to such links. One example of applications in which increased reliability is important is point-to-point video links, such as those used in vehicular backup cameras where a wired connection is cumbersome or unwarranted. In these cases, it is highly important that the video stream be received reliably without any dropout (i.e., low packet loss and a small number of packet retransmissions). Another example of applications in which increased reliability is important is wireless sensors on a vehicle, such as sensors used to monitor tire pressure, engine temperatures, and other critical system parameters. Another application is wireless video distribution from a set-top box or phone to a TV or monitor. In all of these applications, it is extremely important that the information (e.g., video packets) be delivered reliably and without the need for retransmission.

In some embodiments, if the message packets are not the same length, then pad bits or symbols may be inserted to the message packets to ensure that all of the message packets are of equal length before the encoding process. In some cases, the pad bits or symbols are not required to be transmitted wirelessly as long as the packet lengths are known or conveyed to the receiver 112. Then, at the receiver 112, these pad bits or symbols may be re-inserted before the received packets are passed to the network decoder 122.

Figure 4:
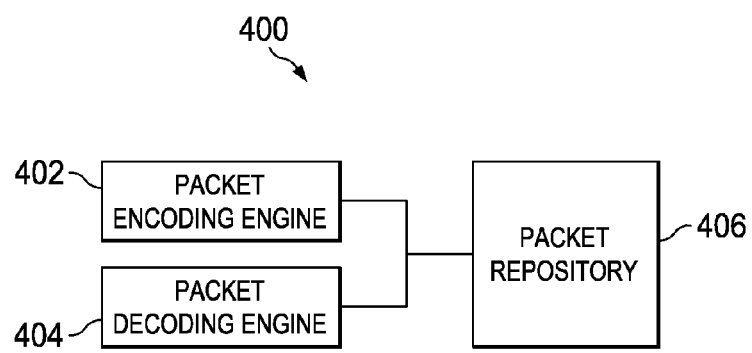
FIG. 4 shows a network coding system in accordance with various embodiments.

FIG. 4 shows a network coding system 400 in accordance with various embodiments. The network coding system 400 includes a packet encoding engine 402 and a packet decoding engine 404. In addition, a packet repository 406 may be coupled to the engines 402, 404. The packet encoding engine 402 and the packet decoding engine 404 are combinations of programming and hardware to execute the programming. Although shown separately, the packet encoding engine 402 and the packet decoding engine 404 are not required to represent separate pieces of software programming. For example, each engine 402, 404 may share a common processor and memory, although this is not required. Additionally, the programming that enables the functionality of each engine 402, 404 may be included in the same executable file or library.

The packet encoding engine 402 receives message packets that contain data to be transmitted from, for example, a higher-layer application executing on the transmitter 102. The message packets may be received from the packet repository 406. The packet encoding engine 402 also encodes the message packets to produce a number of encoded packets greater than the number of message packets. As explained above, the length of the message packets is preserved when encoded to produce the encoded packets, and thus the encoded packets are suitable for subsequent transmission (e.g., by the PHY 108) using an underlying wireless communication protocol of a transmitter. In accordance with various embodiments, the packet encoding engine 402 encodes the message packets by application of a linear operator to the original K message packets. For example, as explained above, a message matrix X is generated from the K message packets and the linear operator is shown as the network code matrix A, which has N columns and K rows. The packet encoding engine 402 encodes the message matrix X by multiplying it by the network code matrix A to produce a transmission matrix Y, which has N columns that each correspond to a transmission packet. Thus, the packet encoding engine 402 performs the encoding process as is described above with respect to FIGS. 1, 2 and 3a.

The packet decoding engine 404 receives a number of received packets that pass the CRC 118. The packet decoding engine 404 may also receive an erasure packet or erasure signal (e.g., from the CRC 118) that indicates one or more transmitted encoded packets were not received successfully. The received packets and/or the erasure packets may be at least temporarily stored at the packet repository 406. Similar to above, the packet decoding engine 404 selects a number of received packets equal to the number of original message packets plus an additional number of packets (i.e., K+1 received packets because the network code matrix applies a near-MDS network code) to form columns of a received packet matrix. The packet decoding engine 404 generates a decoding matrix by forming a sub-matrix by selecting columns of a network coding matrix (e.g., a matrix used by the packet encoding engine 402 to encode message packets prior to their transmission) that have indices that are the same as the indices of the encoded packets that correspond to the selected received packets.

Then, the packet decoding engine 404 identifies a subset of K of the selected columns of the network coding matrix that are linearly independent. The packet decoding engine 404 inverts this subset of K linearly independent columns to form the decoding matrix. The packet decoding engine 404 may further modify the received packet matrix to only contain the K columns that correspond to the subset of K of the selected columns of the network coding matrix that are linearly independent. Finally, the packet decoding engine 404 multiplies the received packet matrix by the decoding matrix to generate a recovery matrix where each column corresponds to a decoded packet. This is similar to the decoding process as described above with respect to FIGS. 1, 2 and 3b.

Figure 5:
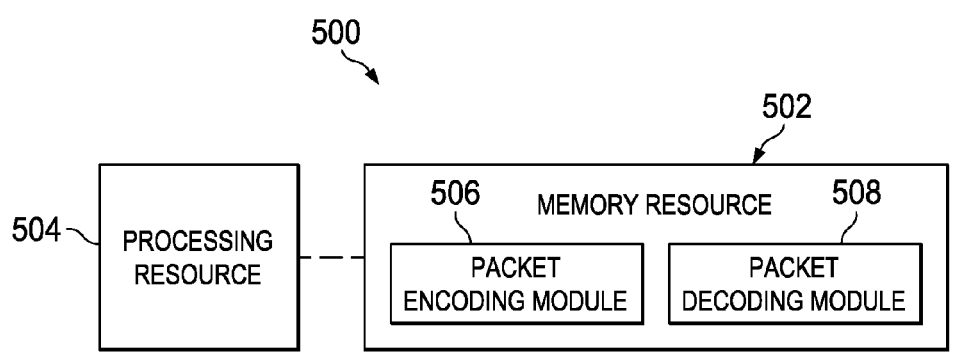
FIG. 5 shows an alternate network coding system in accordance with various embodiments.

FIG. 5 shows another example of a network coding system 500 in accordance with various embodiments. The network coding system 500 includes a memory resource 502 coupled to a processing resource 504. The processing resource 504 is one or more local or distributed processors. The memory resource 502 includes one or more local or distributed memory devices and comprises a packet encoding module 506 and a packet decoding module 508. Thus, the memory resource 502 and the processing resource 504 are hardware components of the system 500.

Each module 506, 508 represents instructions that, when executed by the processing resource 504, implement an associated engine. For example, when the packet encoding module 506 is executed by the processing resource 504, the above-described packet encoding engine 402 functionality is implemented. Similarly, when the packet decoding module 508 is executed by the processing resource 504, the above-described packet decoding engine 404 functionality is implemented. The modules 506, 508 may also be implemented as an installation package or packages stored on the memory resource 502, which may be a CD/DVD or a server from which the installation package may be downloaded. Additionally, in some embodiments, the above-described functionality may be implemented in an application-specific integrated circuit (ASIC), a combination of an ASIC and software, or an application-specific instruction-set processor (ASIP).

Figure 6:
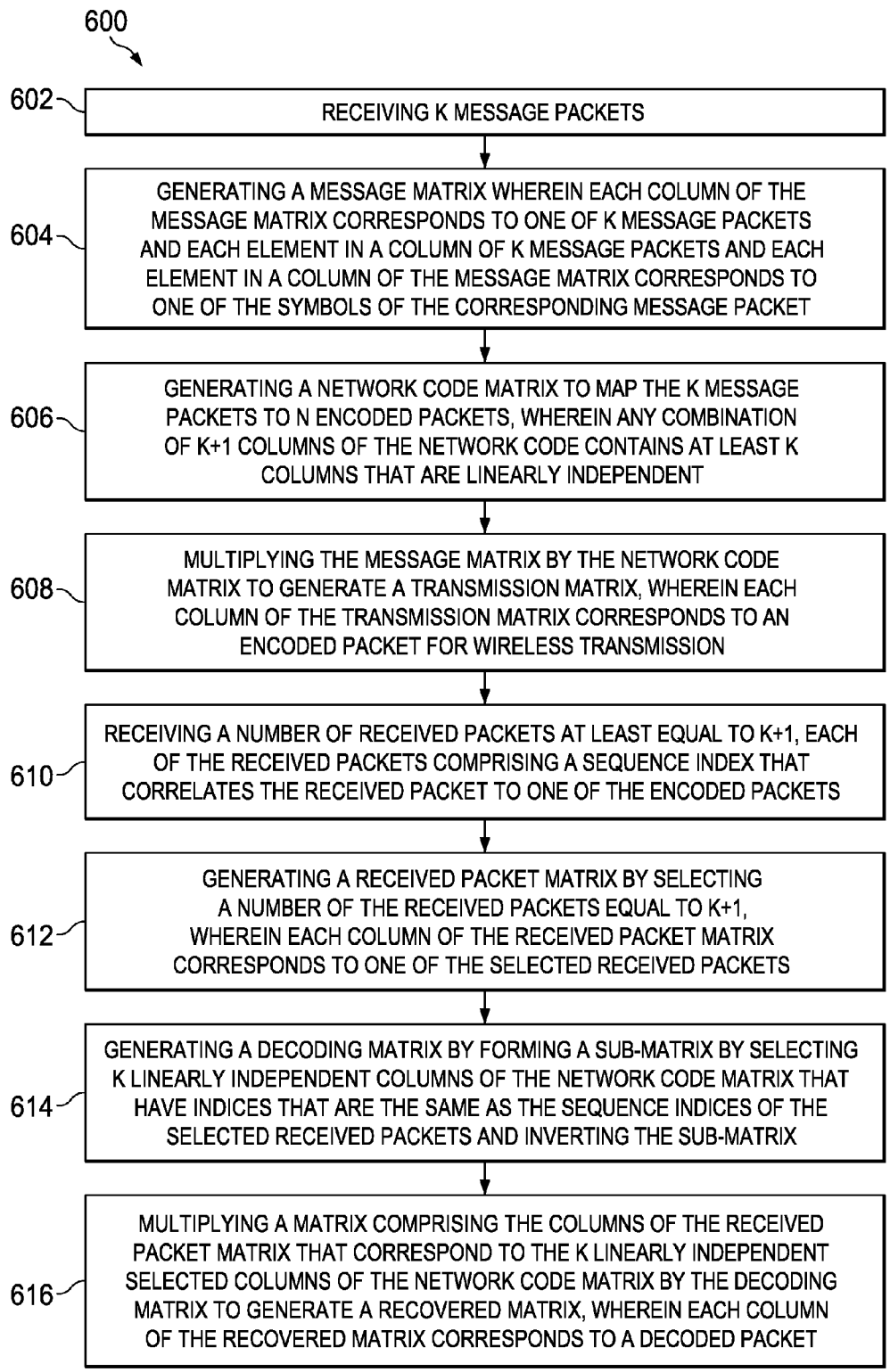
FIG. 6 shows a flow chart of a method in accordance with various embodiments.

FIG. 6 shows a method 600 for network coding in accordance with various embodiments. The method 600 may be performed by, for example, a hardware processor of the transmitter 102 or the receiver 112. The method 600 begins in block 602 with receiving K message packets. The message packets may be received from, for example, a higher-layer application executing on the transmitter 102. The method 600 continues in block 604 with generating a message matrix. Each column of the message matrix corresponds to one of the message packets and each element in a column of the message matrix corresponds to one of the symbols of the corresponding message packet. The method 600 then continues in block 606 with generating a network code matrix to map the K message packets to N encoded packets. Any combination of K+1 columns of the network code contains at least K columns that are linearly independent. The method 600 further continues in block 608 with multiplying the message matrix by the network code matrix to generate a transmission matrix. Each column of the transmission matrix corresponds to an encoded packet for wireless transmission. As explained above, the length of the message packets is preserved when encoded to produce the encoded packets, and thus the encoded packets are suitable for transmission by the PHY 108 using an underlying wireless communication protocol of the transmitter 102, which may be an already-developed wireless communication device. Subsequently, the encoded packets may be sent to the PHY 108 (e.g., via the MAC 106) for wireless transmission.

In some embodiments the method 600 may also include, as in block 610, receiving a number of received packets at least equal to K+1. The received packets include a sequence index that correlates the received packet to one of the encoded packets. The method 600 may further continue in block 612 with generating a received packet matrix by selecting a number of the received packets equal to K+1 and using the selected received packets as columns of the received packet matrix.

The method 600 may then continue in block 614 with generating a decoding matrix by forming a sub-matrix by selecting K linearly independent columns of the network code matrix that have indices that are the same as the sequence indices of the selected received packets and inverting the sub-matrix. This is similar to the decoding matrix generation described above with respect to FIGS. 1 and 3b. Finally, the method 600 may continue in block 616 with multiplying a matrix comprising the columns of the received packet matrix that correspond to the K linearly independent selected columns of the network code matrix by the decoding matrix to generate a recovered matrix, where each column of the recovered matrix corresponds to a decoded packet.

The above discussion is meant to be illustrative of the principles and various embodiments of the present invention. Numerous variations and modifications will become apparent to those skilled in the art once the above disclosure is fully appreciated. For example, although described as a matrix-based implementation, this is done for ease of explanation; the above near-MDS linear network coding scheme may be implemented in other ways, such as the use of linear feedback shift registers, or other methods. Further, although described generally with respect to wireless communications, the above near-MDS linear network coding scheme may be utilized in other communication systems, such as wired systems or powerline communication (PLC) systems. It is intended that the following claims be interpreted to embrace all such variations and modifications.

What is claimed is:

1. A method for network coding using a near-maximum distance separable linear network code, comprising:
    generating, by a processor, a message matrix wherein each column of the message matrix corresponds to one of K message packets and each element in a column of the message matrix corresponds to one of the symbols of the corresponding message packet;
    generating, by the processor, a network code matrix to map the K message packets to N encoded packets, wherein any combination of K+1 columns of the network code contains at least K columns that are linearly independent; and
    multiplying, by the processor, the message matrix by the network code matrix to generate a transmission matrix, wherein each column of the transmission matrix corresponds to an encoded packet for wireless transmission;
    sending by the processor the resulting encoded packets to a physical layer of a wireless transmitter for transmission using an existing underlying wireless communication protocol without modification.

2. The method of claim 1 wherein the method is performed at a network layer of a wireless transmitter.

3. The method of claim 1 further comprising adding pad symbols to one or more of the message packets such that a resulting length of each message packet is the same.

4. The method of claim 1 wherein the number of message packets and encoded packets are given by a coding rate of a linear network code specified by the network code matrix.

5. The method of claim 1 further comprising: receiving, by the processor, a number of received packets at least equal to K+1, each of the received packets comprising a sequence index that correlates the received packet to one of the encoded packets;
    generating, by the processor, a received packet matrix by selecting a number of the received packets equal to K+1, wherein each column of the received packet matrix corresponds to one of the selected received packets;
    generating, by the processor, a decoding matrix by forming a sub-matrix by selecting K linearly independent columns of the network code matrix that have indices that are the same as the sequence indices of the selected received packets and inverting the sub-matrix; and multiplying, by the processor, a matrix comprising the columns of the received packet matrix that correspond to the K linearly independent selected columns of the network code matrix by the decoding matrix to generate a recovered matrix, wherein each column of the recovered matrix corresponds to a decoded packet.

6. A non-transitory computer-readable medium containing instructions that, when executed by a processor, cause the processor to:
    generate a message matrix wherein each column of the message matrix corresponds to one of K message packets and each element in a column of the message matrix corresponds to one of the symbols of the corresponding message packet;
    generate a network code matrix to map the K message packets to N encoded packets, wherein any combination of K+1 columns of the network code contains at least K columns that are linearly independent; and
    multiply the message matrix by the network code matrix to generate a transmission matrix, wherein each column of the transmission matrix corresponds to an encoded packet for wireless transmission;
    sending by the processor the resulting encoded packets to a physical layer of a wireless transmitter for transmission using an existing underlying wireless communication protocol without modification.

7. The non-transitory computer-readable medium of claim 6 wherein executing the instructions further causes the processor to add pad symbols to one or more of the message packets such that a resulting length of each message packet is the same.

8. The non-transitory computer-readable medium of claim 6 wherein the number of message packets and encoded packets are given by a coding rate of a linear network code specified by the network code matrix.

9. The non-transitory computer-readable medium of claim 6 wherein executing the instructions further causes the processor to: receive a number of received packets at least equal to K+1, each of the received packets comprising a sequence index that correlates the received packet to one of the encoded packets;
    generate a received packet matrix by selecting a number of the received packets equal to K+1, wherein each column of the received packet matrix corresponds to one of the selected received packets;
    generate a decoding matrix by forming a sub-matrix by selecting K linearly independent columns of the network code matrix that have indices that are the same as the sequence indices of the selected received packets and inverting the sub-matrix; and
    multiply a matrix comprising the columns of the received packet matrix that correspond to the K linearly independent selected columns of the network code matrix by the decoding matrix to generate a recovered matrix, wherein each column of the recovered matrix corresponds to a decoded packet.

10. A wireless communication device, comprising: a network encoder to:
- generate a message matrix wherein each column of the message matrix corresponds to one of K message packets and each element in a column of the message matrix corresponds to one of the symbols of the corresponding message packet;
- generate a network code matrix to map the K message packets to N encoded packets, wherein any combination of K+1 columns of the network code contains at least K columns that are linearly independent; and
- multiply the message matrix by the network code matrix to generate a transmission matrix, wherein each column of the transmission matrix corresponds to an encoded packet for wireless transmission; and a physical layer to transmit the encoded packets via a wireless antenna;
- sending by the network encoder the resulting encoded packets to the physical layer of the wireless communication device for transmission using an existing underlying wireless communication protocol without modification.

11. The wireless communication device of claim 10 wherein the network encoder comprises a network layer of a wireless transmitter.

12. The wireless communication device of claim 10 wherein the network encoder adds pad symbols to one or more of the message packets such that a length of each message packet is the same.

13. The wireless communication device of claim 10 wherein the number of message packets and encoded packets are given by a coding rate of a linear network code specified by the network code matrix.

14. A method for generating a near-maximum distance separable linear network code having a coding rate of K/N, comprising:
- defining, by a processor, a set V that contains all vectors of length K having entries over a finite field and an initially-empty network code set A; if a cardinality of the network code set A is less than K:
- continually removing, by the processor, a vector $x_i$ from V and inserting $x_i$ into the network code set A if $x_i$ and A are linearly independent; and
- incrementing, by the processor, i; and if the cardinality of the network code set A is greater than or equal to K and the set V is not empty and the cardinality of A is less than N:
- continually removing, by the processor, $x_i$ from V and inserting $x_i$ into the network code set A and incrementing i if all subsets B of the network code set A having a cardinality K contain a subset C of cardinality K−1 that, when combined with $x_i$ forms a linearly independent set; and
- continually removing, by the processor, $x_i$ from V and incrementing i if not all subsets B of the network code set A having a cardinality K contain a subset C of cardinality K−1 that, when combined with $x_i$ forms a linearly independent set;
- sending by the processor the resulting encoded packets to a physical layer of a wireless transmitter for transmission using an existing underlying wireless communication protocol without modification.

* * * * *